(12) United States Patent
Manickam et al.

(10) Patent No.: US 9,266,074 B2
(45) Date of Patent: Feb. 23, 2016

(54) MIXING DEVICE HAVING A PLURALITY OF MIXING CHANNELS

(71) Applicant: General Electric Company, Schenectady, NY (US)

(72) Inventors: Bhuvaneswaran Manickam, Schwaz (AT); Arne Martin Bienholz, Jenbach (AT); Friedhelm Hillen, Jenbach (AT)

(73) Assignee: General Electric Company, Schenectady, NY (US)

(*) Notice: Subject to any disclaimer, the term of this patent is extended or adjusted under 35 U.S.C. 154(b) by 532 days.

(21) Appl. No.: 13/688,518

(22) Filed: Nov. 29, 2012

(65) Prior Publication Data
US 2013/0330242 A1    Dec. 12, 2013

(30) Foreign Application Priority Data
Jun. 7, 2012  (EP) .................................. 12171197

(51) Int. Cl.
*B01D 50/00* (2006.01)
*B01F 5/00* (2006.01)
*B01F 5/04* (2006.01)
(Continued)

(52) U.S. Cl.
CPC ............. *B01F 5/0057* (2013.01); *B01F 5/0065* (2013.01); *B01F 5/0456* (2013.01); *B01F 5/0466* (2013.01); *B01F 5/0693* (2013.01); *F01N 3/106* (2013.01); *F01N 3/2033* (2013.01); *F01N 3/24* (2013.01); *F01N 3/36* (2013.01); *F01N 2240/20* (2013.01); *F01N 2610/03* (2013.01); *Y02T 10/26* (2013.01)

(58) Field of Classification Search
CPC ..... F01N 3/2033; F01N 3/24; F01N 2610/03; F01N 2240/20; B01F 5/0065; B01F 5/0466
USPC ................................ 422/176, 177; 366/165.2
See application file for complete search history.

(56) References Cited

U.S. PATENT DOCUMENTS 3,011,584 A * 12/1961 Lemmerman et al. ........ 181/217
3,702,619 A    11/1972 Son
(Continued)

FOREIGN PATENT DOCUMENTS

DE    102006055655 A1    5/2008
EP        1004767 A2    5/2000
(Continued)

OTHER PUBLICATIONS

Search Report and Written Opinion from corresponding European Application No. 12171197.2-1253, dated Nov. 21, 2012.
(Continued)

*Primary Examiner* — Tom P Duong
(74) *Attorney, Agent, or Firm* — Ernest G. Cusick; Hoffman Warnick LLC

(57) ABSTRACT

A mixing device having a chamber is provided. The chamber includes an inlet, a main body, and a flow axis. The main body is configured for containing a fluid circulating generally along the flow axis. The inlet is configured to receive at least one fluid stream and is oriented in a flow plane generally perpendicular to the flow axis. A plurality of mixing channels that each receive portions of the fluid stream from the inlet are provided. The plurality of mixing channels are each oriented along the flow plane and have unequal distinct lengths configured to release the portions of the fluid stream into the chamber at discrete time intervals.

18 Claims, 4 Drawing Sheets

(51) Int. Cl.
*B01F 5/06* (2006.01)
*F01N 3/24* (2006.01)
*F01N 3/10* (2006.01)
*F01N 3/20* (2006.01)
*F01N 3/36* (2006.01)

(56) References Cited

U.S. PATENT DOCUMENTS

| | | |
|---|---|---|
| 6,840,039 B2 | 1/2005 | Huh |
| 7,063,817 B2 * | 6/2006 | Sigling .................. 422/171 |
| 7,449,157 B2 | 11/2008 | Kanno et al. |
| 7,552,722 B1 | 6/2009 | Shieh et al. |
| 7,721,845 B2 | 5/2010 | Gorenflo |
| 7,883,570 B2 | 2/2011 | Obrejanu |
| 2005/0123020 A1 | 6/2005 | Nakamura |
| 2007/0289294 A1 | 12/2007 | Werni et al. |
| 2009/0084263 A1 | 4/2009 | Obrejan |
| 2009/0095222 A1 | 4/2009 | Tam et al. |
| 2009/0120364 A1 | 5/2009 | Suarez et al. |
| 2009/0165756 A1 | 7/2009 | Shieh |
| 2009/0293721 A1 | 12/2009 | Miller |
| 2011/0005511 A1 | 1/2011 | Marple |
| 2011/0088391 A1 | 4/2011 | Sumser et al. |
| 2011/0128814 A1 | 6/2011 | Hanada |
| 2011/0199855 A1 | 8/2011 | Hanada |

FOREIGN PATENT DOCUMENTS

| | | |
|---|---|---|
| EP | 2111916 A1 | 10/2009 |
| EP | 2133548 A1 | 12/2009 |
| WO | 2007140148 A2 | 12/2007 |

OTHER PUBLICATIONS

Toh et al.; Observation of Neutron-Induced Signals Using Two-Dimensional Micro-Pixel Gas Chamber; Nuclear Science Symposium Conference Record, Oct. 19-25, 2008; ISSN 10823654; pp. 2358-2361.

* cited by examiner

MIXING DEVICE HAVING A PLURALITY OF MIXING CHANNELS

CROSS-REFERENCE TO RELATED APPLICATIONS

This application claims the benefit of European Patent Application No. EP12171197.2, filed Jun. 7, 2012, which is incorporated herein by reference in its entirety.

BACKGROUND OF THE INVENTION

The subject matter disclosed herein relates to a mixing device, and particularly to a mixing device having a plurality of mixing channels that each include unequal distinct lengths.

A gas engine burns methane to produce mechanical energy. During standard or normal engine operation, the gas engine produces exhaust gas with a relatively low concentration of methane (e.g., about 500 ppm), which is passed directly to a catalyst. The methane is generally converted or oxidized into carbon dioxide and water by the catalyst.

In the event the gas engine misfires, a fuel-air mixture having a relatively high amount of methane (e.g., about 45,000 ppm) is released from a cylinder of the gas engine, and travels into an exhaust gas manifold. As the methane is oxidized in the catalyst, a relatively high amount of heat is produced within the catalyst, due to the elevated amount of methane in the exhaust gas. Specifically, there is a possibility that the catalyst may experience elevated temperatures above 900° C., which adversely affects the mechanical stability of a catalyst washcoat. The elevated temperatures may also create sintering of precious metals in the catalyst, which may decrease the conversion efficiency of the catalyst. Moreover, the elevated temperatures may also cause the catalyst to melt, which can affect channel structure of the catalyst.

Various devices currently exist to mix two or more streams of fluid (e.g., gas or liquid) together. For example, if multiple liquid streams need to be mixed, an agitator may be provided to create additional turbulence. In another example, if multiple gas streams need to be mixed, a flow strainer may be provided to create turbulence. However, these approaches have several drawbacks. Agitators tend to mix the multiple liquid streams together in a horizontal direction, which requires a relatively large mixing chamber volume. In some circumstances, providing an agitator may not be possible, due to the limited amount of space available and packaging constraints. Also, flow strainers create a relatively large pressure drop, especially at higher flow rates. Moreover, in the event a misfire situation occurs, flow strainers do not usually uniformly mix the methane with the exhaust gas.

BRIEF DESCRIPTION OF THE INVENTION

According to one aspect of the invention, a mixing device having a chamber is provided. The chamber includes an inlet, a main body, and a flow axis. The main body is configured for containing a fluid circulating generally along the flow axis. The inlet is configured to receive at least one fluid stream and is oriented in a flow plane generally perpendicular to the flow axis. A plurality of mixing channels that each receive portions of the fluid stream from the inlet are provided. The plurality of mixing channels are each oriented along the flow plane and have unequal distinct lengths configured to release the portions of the fluid stream into the chamber at discrete time intervals.

According to another aspect of the invention, a mixing device for an exhaust gas treatment system is provided. The mixing device includes a chamber, and the chamber includes an inlet, a main body, and a flow axis. The main body is configured for containing a fluid circulating generally along the flow axis. The inlet is configured to receive at least one fluid stream and is oriented in a flow plane generally perpendicular to the flow axis. A plurality of mixing channels that each receive portions of the fluid stream from the inlet are provided. The plurality of mixing channels are each oriented along the flow plane and have unequal distinct lengths configured to release the portions of the fluid stream into the chamber at discrete time intervals. An exhaust gas treatment catalyst block positioned within the chamber upstream of the outlet to receive the portions of the multiple fluid streams.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
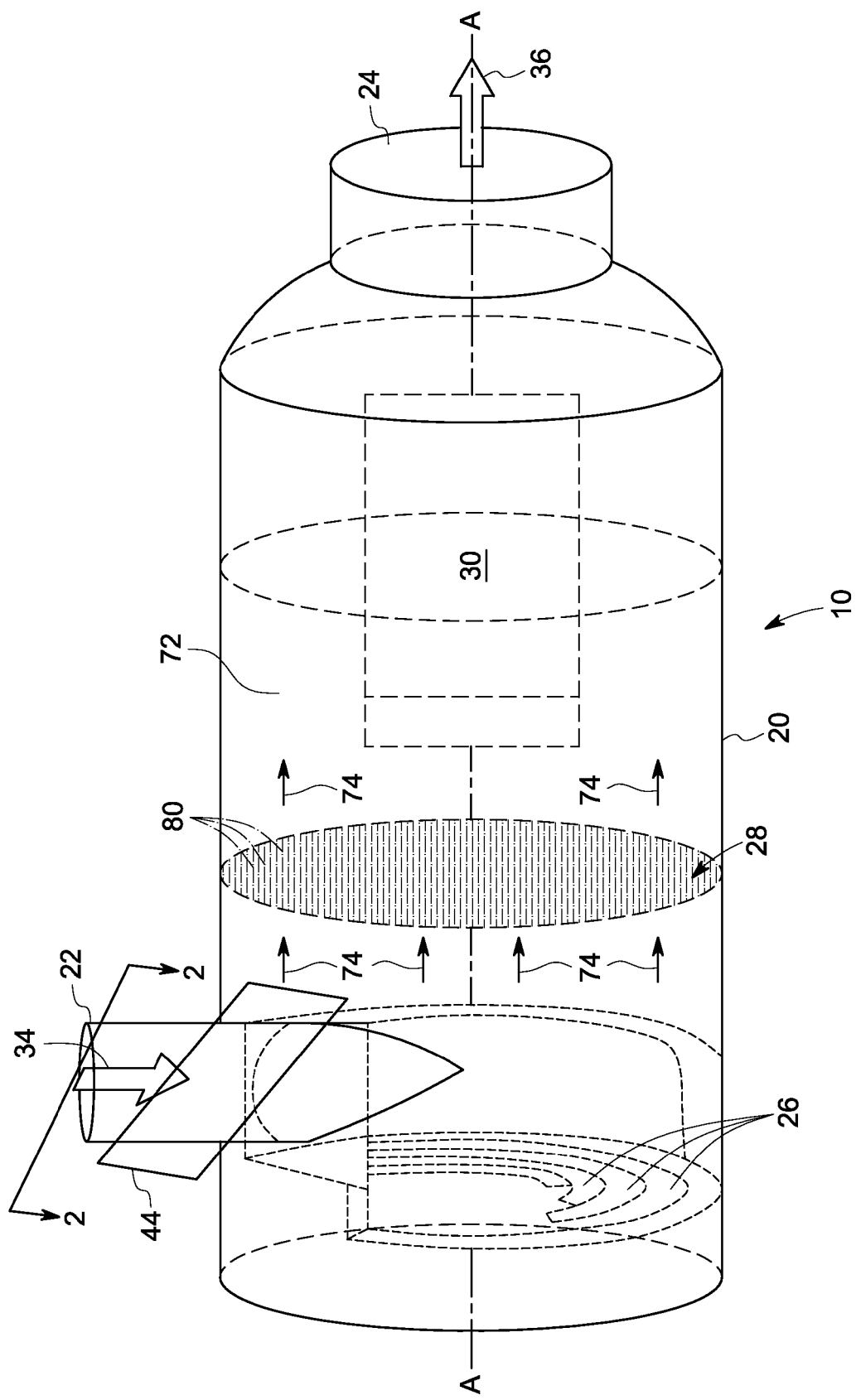
FIG. 1 is an illustration of an exemplary mixing device.

FIG. 1 is an exemplary illustration of a mixing device 10. In the exemplary embodiment as shown, the mixing device 10 includes a chamber 20 having an inlet 22 and an outlet 24. The mixing device also includes a plurality of mixing channels 26, a flow strainer 28, and a catalyst block 30. The inlet 22 is configured to receive at least one fluid stream 34, where the fluid stream includes either gas or liquid. The mixing device 10 expels a fluid stream 36 that exits the mixing device 10 through the outlet 24. The chamber 20 may be a generally cylindrical body that extends along a generally horizontal axis A-A. The outlet 24 is oriented along the horizontal axis A-A, and the fluid stream 36 flows along the horizontal axis A-A. The inlet 22 is oriented in a flow plane 44 that is generally perpendicular with respect to the horizontal axis A-A. The mixing channels 26 are each fluidly connected to the inlet 22 to receive a portion of the fluid stream 34. Each of the mixing channels 26 are also oriented in flow plane 44, and are generally perpendicular to the horizontal axis A-A.

Figure 3:
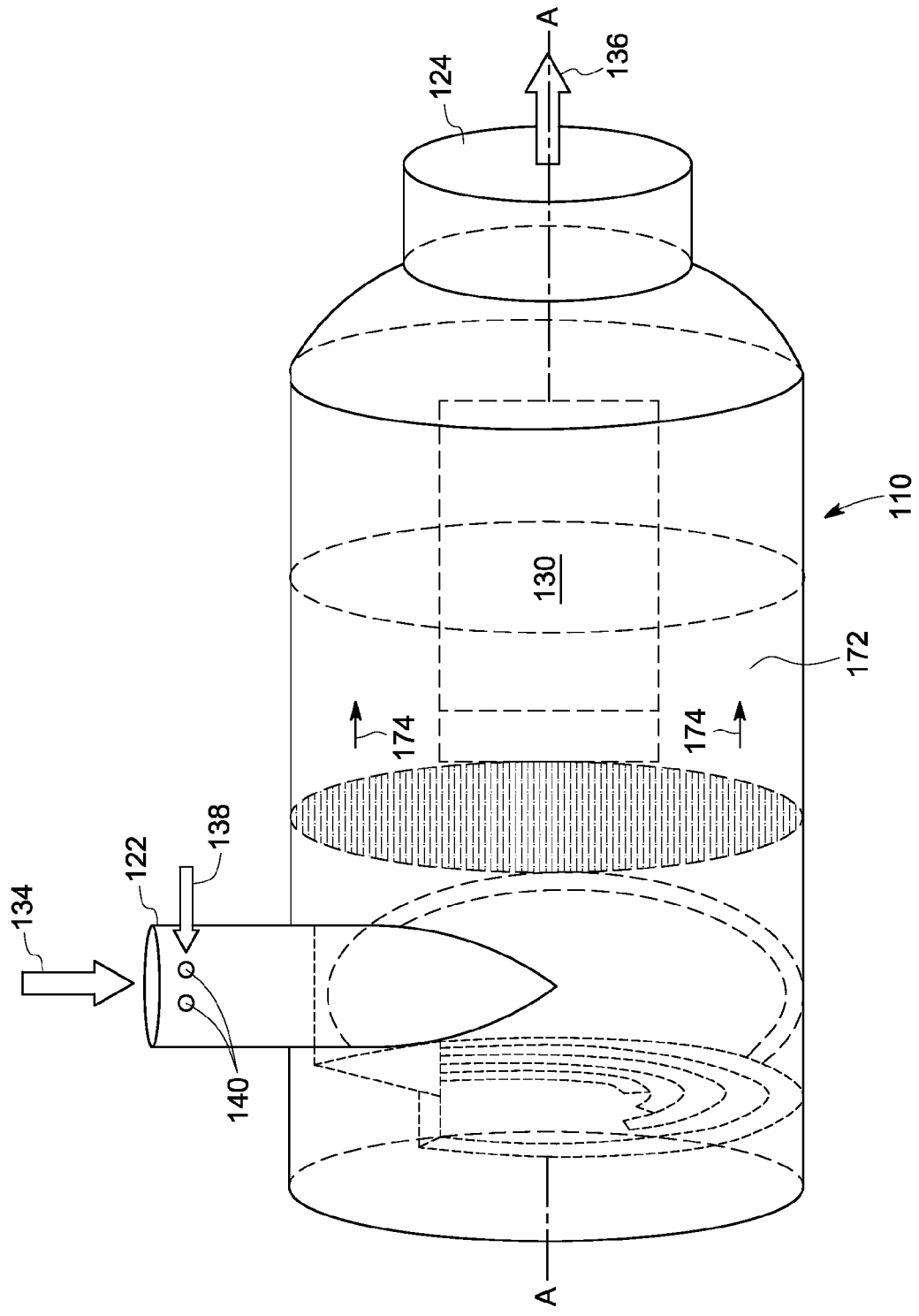
FIG. 3 is an alternative embodiment of the mixing device shown in FIG. 1.

In one embodiment, the mixing device 10 is part of an exhaust gas treatment system for a gas engine (not shown), however it is to be understood that the mixing device 10 may be utilized in a variety of applications. For example, if the inlet 22 receives only one fluid stream 34, then the mixing device 10 may be used to dilute or reduce the concentration of components (e.g., methane) within the fluid stream 34 if the concentration of the fluid stream 34 varies with time. Alternatively, in another embodiment of a mixing device 110 shown in FIG. 3, an inlet 122 may be configured to receive multiple fluid streams. Specifically, the inlet 122 receives a fluid stream 134 as well as a secondary fluid stream 138 through a plurality of side apertures 140, where the apertures 140 may be of any size. Alternatively, instead of apertures 140, a secondary pipe or tubular member (not shown) may be used instead. In the embodiment as shown in FIG. 3, the mixing device 110 may be used to dilute or reduce the concentration of the secondary fluid stream 138 combined with the fluid stream 134.

Figure 2:
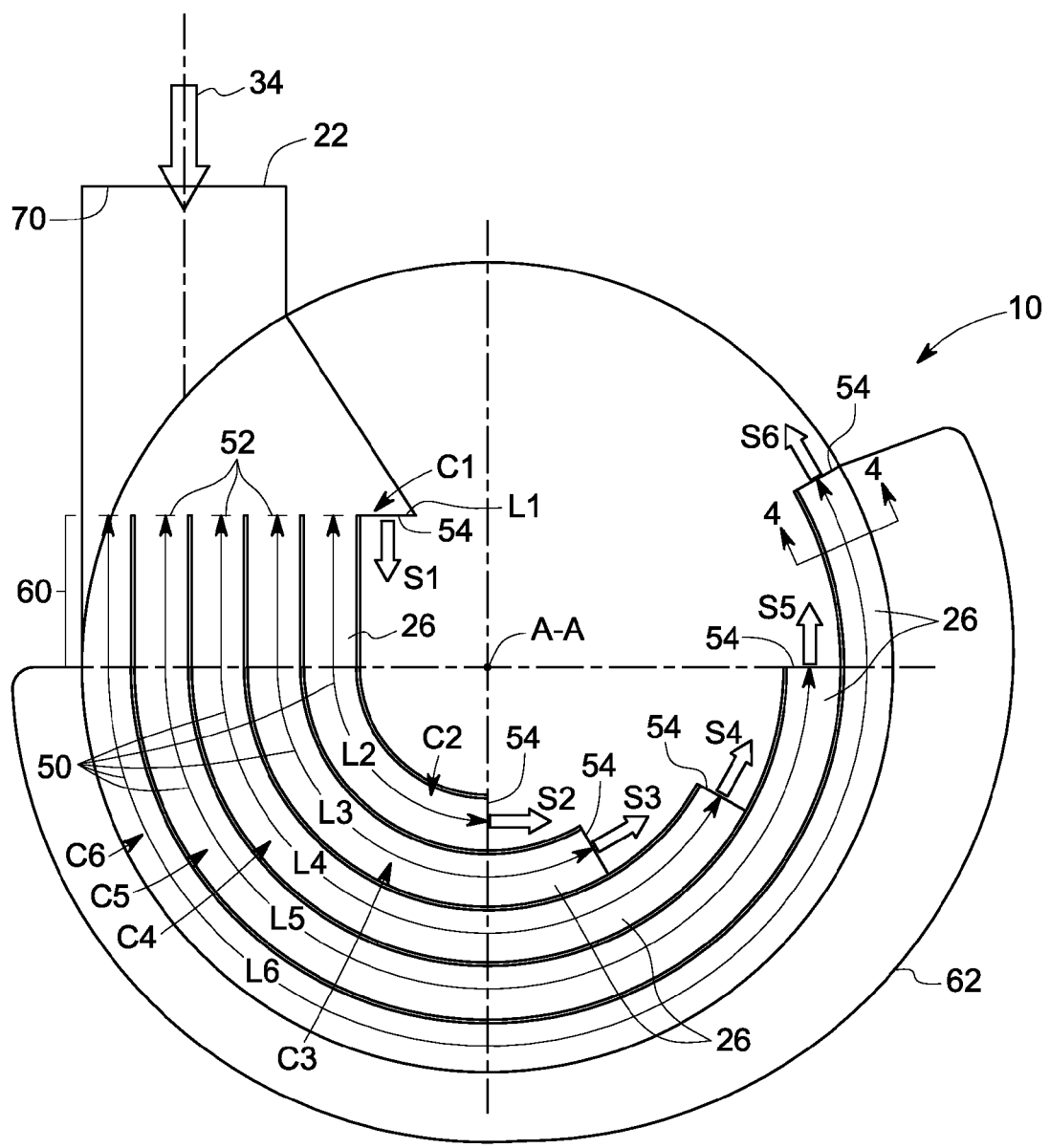
FIG. 2 is a cross-sectioned view of the mixing device shown in FIG. 1, taken along section 2-2.

Turning now to FIG. 2, which is a cross-sectioned view of the mixing device 10 taken along section line 2-2 in FIG. 1, each of the mixing channels 26 have unequal distinct lengths 50. Specifically, each of the mixing channels 26 include an entrance 52 and an exit 54, where the length 50 is measured between the entrance 52 and the exit 54. In the embodiment as shown, six mixing channels C1-C6 are included. Each of the six mixing channels C1-C6 have corresponding lengths L1-L6, where mixing channel C1 includes the shortest length L1 (in the embodiment as shown, L1 is about zero), and the channel C6 includes the longest length L6. It should be noted that while FIG. 2 illustrates six mixing channels C1-C6, it is to be understood that the number of mixing channels 50 may vary depending on the initial flow rate and the concentration of the fluid stream 34.

Figure 4:
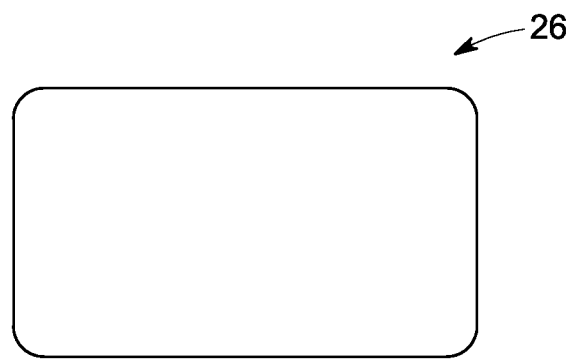
FIG. 4 is a cross-sectioned view of one of the mixing channels illustrated in FIG. 2.

FIG. 4 is a sectional view of one of the mixing channels 26 taken along section line 4-4 of mixing channel C6. In the embodiment as shown in FIG. 3, the mixing channel 26 includes a generally closed rectangular cross-section, however it is to be understood that the mixing channels 26 may include various cross-sectional shapes as well.

Turning back to FIG. 2, each of the mixing channels 26 include a generally linear portion 60 and a curved or arcuate portion 62. The linear portion 60 of each mixing channel 26 is positioned to receive a portion of the fluid stream 34 from the inlet 22 of the mixing device 10. A portion of the fluid stream 34 flows through each linear portion 60 to the arcuate portion 62, and is released from each of the mixing channels 26 through the exit 54. In the embodiment as shown in FIG. 2, the arcuate portions 62 of the mixing channels 26 are each positioned to be concentric with one another. Specifically, each of the arcuate portions 62 share a common center, which is the horizontal axis A-A. It should be noted that while FIG. 2, illustrates the mixing channels 26 each having the linear portion 60 and the arcuate portion 62, the mixing channels 62 may include other types of geometries and configurations as well.

In the exemplary embodiment as shown in FIG. 2, each of the exits 54 terminate at varying angles that are measured with respect to an opening 70 of the inlet 22 of the mixing device 10. Specifically, the exit 54 of the mixing channel C1 is angled at about 0°, the exit 54 of the mixing channel C2 is angled at about 90°, the exit 54 of the mixing channel C3 is angled at about 120°, the exit 54 of the mixing channel C4 is angled at about 150°, the exit 54 of the mixing channel C5 is angled at about 180°, and the exit 54 of the mixing channel C6 is angled at about 210° with respect to the opening 70. However, it is to be understood that different angular configurations may be used as well.

Referring now to both FIGS. 1-2, because each of the mixing channels 26 have unequal distinct lengths 50 (e.g., lengths L1-L6), portions of the fluid stream 34 are released into a main body 72 of the chamber 20 at discrete time intervals. For example, the mixing channel C1 releases a portion S1 of the fluid stream 34 at a first time interval, the mixing channel C2 releases a portion S2 of the fluid stream 34 at a second time interval, the mixing channel C3 releases a portion S3 of the fluid stream 34 at a third time interval, the mixing channel C4 releases a portion S4 of the fluid stream 34 at a fourth time interval, the mixing channel C5 releases a portion S5 fluid stream 34 at a fifth time interval, and the mixing channel C6 releases a portion S6 of the fluid stream 34 at a sixth time interval. Thus, the mixing channels C1-C6 release only portions S1-S6 of the fluid stream 34 at discrete times into a relatively slow-moving fluid 74 that circulates within the main body 72 of the chamber 20 and is oriented generally along a flow axis, which is the horizontal axis A-A. The slow-moving fluid 74 is created by a relatively sudden increase of channel-to-chamber change in diameter (e.g., as fluid enters the main body 72 of the chamber 20, the fluid velocity decreases), thereby creating the relatively slow-moving fluid 74. Although FIGS. 1-2 illustrate fluid exiting the mixing channels C1-C6 in a direction generally perpendicular to the horizontal axis A-A, it is to be understood that the fluid may also enter the main body 72 of the chamber 20 along the horizontal axis A-A as well. The slow-moving fluid 74 circulates within the main body 72 of the chamber at a chamber velocity. The portions S1-S6 exit the mixing channels C1-C6 at a mixing channel velocity, where the chamber velocity is less than the mixing channel velocity.

The portions S1-S6 of the fluid stream 34 enter the main body 72 of the chamber 20 and transfer momentum to the slow-moving fluid 74, thereby creating circulation within the main body 72 of the mixing device 10. Also, because the fluid stream 34 is divided into smaller portions S1-S6, turbulence within the main body 72 is increased, which in turn enhances mixing of the fluid stream 34 with the slow-moving fluid 74. In other words, dividing the fluid stream 34 into smaller portions S1-S6 results in a more uniform concentration of the fluid stream 34 that is mixed with the slow-moving fluid 74 in the main body 72 of the mixing device 10. Moreover, because each of the portions S1-S6 of the fluid stream 34 are released into the slow-moving fluid 74 at discrete time intervals, the concentration of the fluid stream 34 within the main body 72 of the mixing device 10 is diluted.

Referring to FIG. 1, in one embodiment the flow strainer 28 may be placed downstream of the mixing channels 26, and receives a mixture of the fluid stream 34 with the slow-moving fluid 74. The flow strainer 28 may include a grid or a series of perforations 80. The number of flow strainers 28, number of holes or perforations, and hole or perforation size in the flow strainer 28 depend on the mixing application. First, the flow strainer 28 breaks the swirling flow motion in fluid, thus, creates a homogenous or generally uniform flow velocity along the flow direction. Second, the flow strainer creates additional straining effects, thus, further enhancing mixing of the fluid stream 34 with the slow-moving fluid 74. The catalyst block 30 may be positioned upstream of the outlet 24 and downstream of the flow strainer 28. In one embodiment, the catalyst block 30 is an oxidization catalyst for converting unburned hydrocarbons, such as methane, into carbon dioxide and water. A generally uniform mixture of the fluid stream 34 with the slow-moving fluid 74 flows through the catalyst block 30. The fluid stream 34 is oxidized, and exits the mixing device 10 as the fluid stream 36 through the outlet 24.

Referring now to FIGS. 2-3, if two or more fluid streams (e.g., the fluid stream 134 and the secondary fluid stream 138) are provided to the inlet 122, the fluid stream 134 and the secondary fluid stream 138 are combined together within the inlet 122 before entering the mixing channels 26. The portions S1-S6 of the fluid stream 134 combined with the secondary fluid stream 138 are released into a main body 172 of the mixing device 120 by the mixing channels 26 at discrete time intervals. Thus, the mixing device 110 dilutes or reduces the concentration of the secondary fluid stream 138 that is released into a slow-moving fluid 174. Moreover, the mixing device 110 also divides the fluid stream 134 and the secondary fluid stream 138 into smaller portions S1-S6, which results in a more uniform concentration of the secondary fluid stream 134 in the main body 172 of the mixing device 120.

For example, in one illustrative embodiment, if the mixing chamber 110 is part of an exhaust treatment system for a gas engine (not shown), the fluid stream 134 contains exhaust gas that is created during operation of the engine, as well as a misfire gas that contains a fuel-air mixture having a relatively high amount of methane (e.g., about 45,000 ppm) enters in to the mixing chamber through inlet 122 if the gas engine misfires. Each of the mixing channels C1-C6 release portions S1-S6 of the fluid stream 134 (which contains misfire gas) into the slow-moving fluid 174 at discrete time intervals. This dilutes the concentration of methane within the slow-moving fluid 174, as well as creating a more uniform concentration of methane mixed with the slow-moving fluid 174. The flow strainer 138 breaks up a swirling flow motion and enhances mixing between the fluid stream 134 and the slow-moving fluid 174. For example, in one embodiment, the concentration of methane may be reduced from about 45,000 ppm at the inlet 122 to about 4,000 ppm before entering the catalyst block 130. Thus, because the concentration of methane is diluted and is generally uniformly distributed before flowing into a catalyst block 130, this reduces the possibility that a relatively high amount of heat may be produced within the catalyst block 130 during oxidization of the methane. This in turn enhances or improves the durability of the catalyst block 130.

In another illustrative embodiment, the secondary fluid stream 138 may be relatively pure methane gas injected into the fluid stream 134, where the fluid stream 134 contains relatively lower calorific gases such as, for example, landfill or bio-gas. The methane addition is used to enhance the fuel quality, and alters the fuel methane number and combustion characteristics inside the engine cylinder of an engine or any other power generation unit. The methane enriched landfill gas can be used directly with gas engines or any other power generation unit; and the mixing device 110 may be part of an engine or a separate unit. Similar to the previous illustrative embodiment, each of the mixing channels C1-C6 receives portions of the methane gas (e.g., the secondary fluid stream 138) with the landfill or bio-gas. A part of the mixing process between the fluid stream 134 and the secondary fluid stream 138 occurs within the channels C1-C6. Portions of partially mixed fluid streams (e.g., fluid stream 134 and the secondary fluid stream 138) are then completely mixed by releasing portions S1-S6 of the partially mixed fluid streams into the slow-moving fluid 174 of the chamber 120 at discrete time intervals. Releasing portions S1-S6 into the slow-moving 174 at discrete time intervals increases turbulence with the slow-moving fluid 174, thus, improves mixing of fluids. A more uniform methane concentration is created after mixing. Furthermore, the mixing device 110 can be employed in a selective catalytic reduction (SCR) technique where an aqueous urea solution is mixed with exhaust gas before passing the exhaust gas into the catalyst. The working principle remains same as explained in the above illustrative embodiments. The unique approach of releasing fluid in different time intervals improves mixing quality, reduces pressure loss and eliminates moving parts in the mixing device 110.

Referring generally to FIGS. 1-4, the mixing devices 10 and 110 as described above provide enhanced mixing of one or more fluid streams with a relatively slow-moving fluid 74 and 174 located within the main body 72 and 172, while providing reduced residence time and reduced packaging space. The mixing channels 26 (FIG. 2) are oriented in the flow plane 44 (FIG. 1), and are generally perpendicular with respect to the horizontal axis A-A. That is, referring specifically to FIG. 2, the mixing channels 26 do not extend along the horizontal axis A-A of the mixing device 10, but rather extend around the horizontal axis A-A (i.e., the concentric arcuate portions 62). This configuration results in a more compact mixing device 10 and 110, and reduces the amount of space needed. Moreover, because the fluid streams are divided into smaller portions S1-S6 before entering the main body 72 and 172 at discrete time intervals, this enhances mixing and reduces the concentration of the fluid streams with the slow-moving fluid 74 and 174.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A mixing device, comprising:
 a chamber including a main body, an inlet, and a flow axis, the main body configured for containing a fluid circulating generally along the flow axis, the inlet configured to receive at least one fluid stream, and the inlet being oriented in a flow plane generally perpendicular to the flow axis;
 at least three mixing channels that each receive portions of the at least one fluid stream from the inlet, the at least three mixing channels each oriented along the flow plane and each having an unequal distinct length configured to release the portions of the at least one fluid stream into the chamber at discrete time intervals,
  wherein the at least three mixing channels each include a generally linear portion and an arcuate portion, the arcuate portions of the at least three mixing channels are positioned to be concentric with one another; and
 a plurality of exits wherein one exit corresponds to each of the at least three mixing channels, each exit being located at a different distance from the inlet.

2. The mixing device of claim 1, wherein the arcuate portion of each of the at least three mixing channels share a common center that is a horizontal axis of the chamber.

3. The mixing device of claim 1, wherein each of the plurality of exits terminates at a different angle measured with respect to the inlet.

4. The mixing device of claim 3, wherein six mixing channels are provided, and wherein the plurality of exits are positioned at about 0°, 90°, 120°, 150°, 180°, and 210° with respect to the inlet.

5. The mixing device of claim 1, comprising a flow strainer that is positioned within the chamber, and wherein the flow strainer is in fluid communication with the at least three mixing channels to receive the portions of the at least one fluid stream.

6. The mixing device of claim 1, comprising an exhaust gas treatment catalyst block that is positioned within the chamber upstream of an outlet.

7. The mixing device of claim 1, wherein the chamber includes a main body configured to contain a slow-moving fluid that circulates within the main body at a chamber velocity.

8. The mixing device of claim 7, wherein the portions of the at least one fluid stream exit the at least three mixing channels at a mixing channel velocity, wherein the chamber velocity is less than the mixing channel velocity.

9. The mixing device of claim 1, wherein the inlet is configured to receive multiple fluid streams.

10. The mixing device of claim 1, wherein at least one of the plurality of exits terminates at an angle greater than 180 degrees with respect to the inlet.

11. An exhaust gas treatment system having a mixing device, comprising:
a chamber including a main body, an inlet, an outlet, and a flow axis, the main body configured for containing a fluid circulating generally along the flow axis, inlet configured to receive multiple fluid streams, and being oriented in a flow plane generally perpendicular to the flow axis;
at least three mixing channels that each receive portions of the multiple fluid streams from the inlet, the at least three mixing channels each oriented along the flow plane and each having an unequal distinct length such that the portions of the multiple fluid streams are released into the chamber at discrete time intervals,
wherein the at least three mixing channels each include a generally linear portion and an arcuate portion, the arcuate portions of the at least three mixing channels are positioned to be concentric with one another;
a plurality of exits wherein one exit corresponds to each of the at least three mixing channels, each exit being located at a different distance from the inlet; and
an exhaust gas treatment catalyst block positioned within the chamber upstream of the outlet to receive the portions of the multiple fluid streams.

12. The mixing device of claim 11, wherein each of the plurality of exits terminates at a different angle measured with respect to the inlet.

13. The mixing device of claim 12, wherein six mixing channels are provided, and wherein the plurality of exits are positioned at about 0°, 90°, 120°, 150°, 180°, and 210° with respect to the inlet.

14. The mixing device of claim 11, comprising a flow strainer that is positioned within the chamber, and wherein the flow strainer is in fluid communication with the at least three mixing channels to receive the portions of the multiple fluid streams.

15. The mixing device of claim 11, wherein the chamber includes a main body configured to contain a slow-moving fluid that circulates within the main body at a chamber velocity.

16. The mixing device of claim 15, wherein the portions of the multiple fluid streams exit the at least three mixing channels at a mixing channel velocity, wherein the chamber velocity is less than the mixing channel velocity.

17. The mixing device of claim 11, wherein at least one of the plurality of exits terminates at an angle greater than 180 degrees with respect to the inlet.

18. A mixing device, comprising:
a chamber including a main body, an inlet, and a flow axis, the main body configured for containing a fluid circulating generally along the flow axis, the inlet configured to receive at least one fluid stream and, being oriented in a flow plane generally perpendicular to the flow axis;
a plurality of mixing channels that each receive portions of the at least one fluid stream from the inlet, the plurality of mixing channels each oriented along the flow plane and having unequal distinct lengths configured to release the portions of the at least one fluid stream into the chamber at discrete time intervals; and
a plurality of exits, wherein each of the plurality of exits correspond to one of the plurality of mixing channels, and wherein each of the plurality of exits terminate at varying angles that are measured with respect to the inlet,
wherein six mixing channels are provided, and wherein the plurality of exits are positioned at about 0°, 90°, 120°, 150°, 180°, and 210°, respectively, with respect to the inlet.

* * * * *